Oct. 31, 1944.  G. FROVA  2,361,834
AUTOMATIC APPARATUS FOR FEEDING, DESTEMMING
AND PITTING CHERRIES AND OTHER FRUITS
Filed Feb. 22, 1943   7 Sheets-Sheet 1

INVENTOR.
Giovanni Frova
BY
Haseltine, Lake & Co.
ATTORNEYS.

Oct. 31, 1944.  G. FROVA  2,361,834
AUTOMATIC APPARATUS FOR FEEDING, DESTEMMING
AND PITTING CHERRIES AND OTHER FRUITS
Filed Feb. 22, 1943  7 Sheets-Sheet 3

INVENTOR.
Giovanni Frova
BY
Haseltine, Lake & Co.
ATTORNEYS.

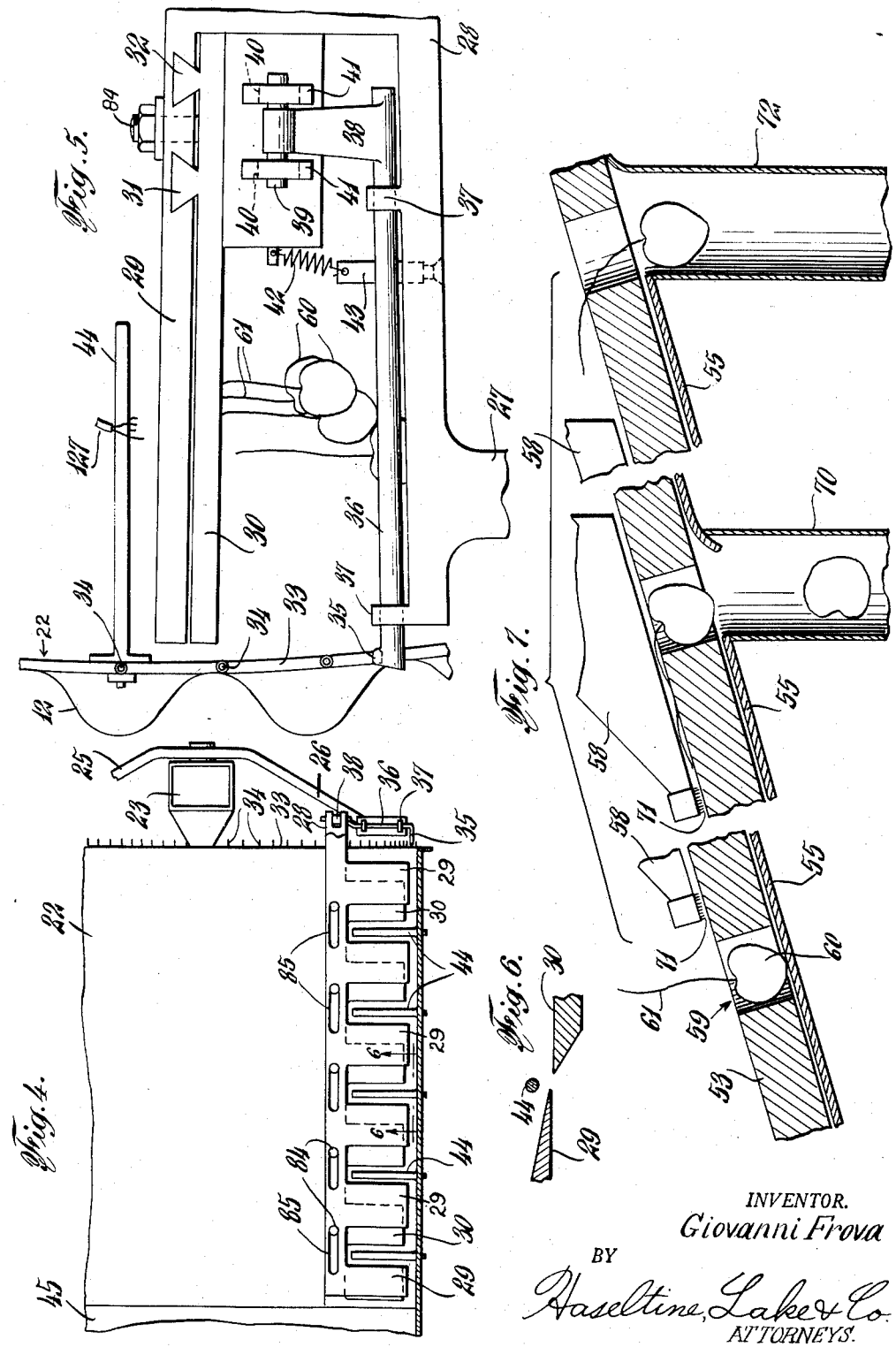

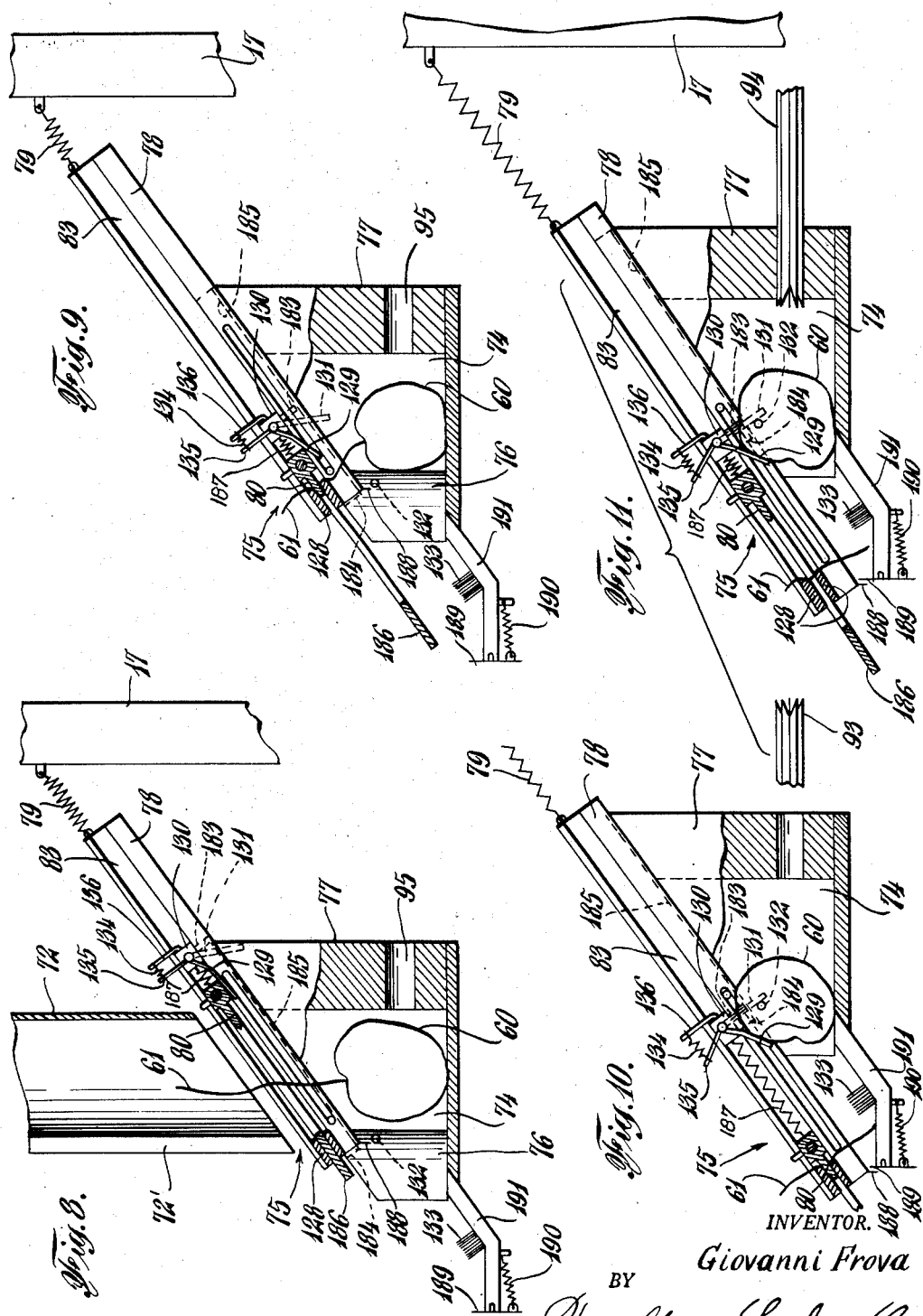

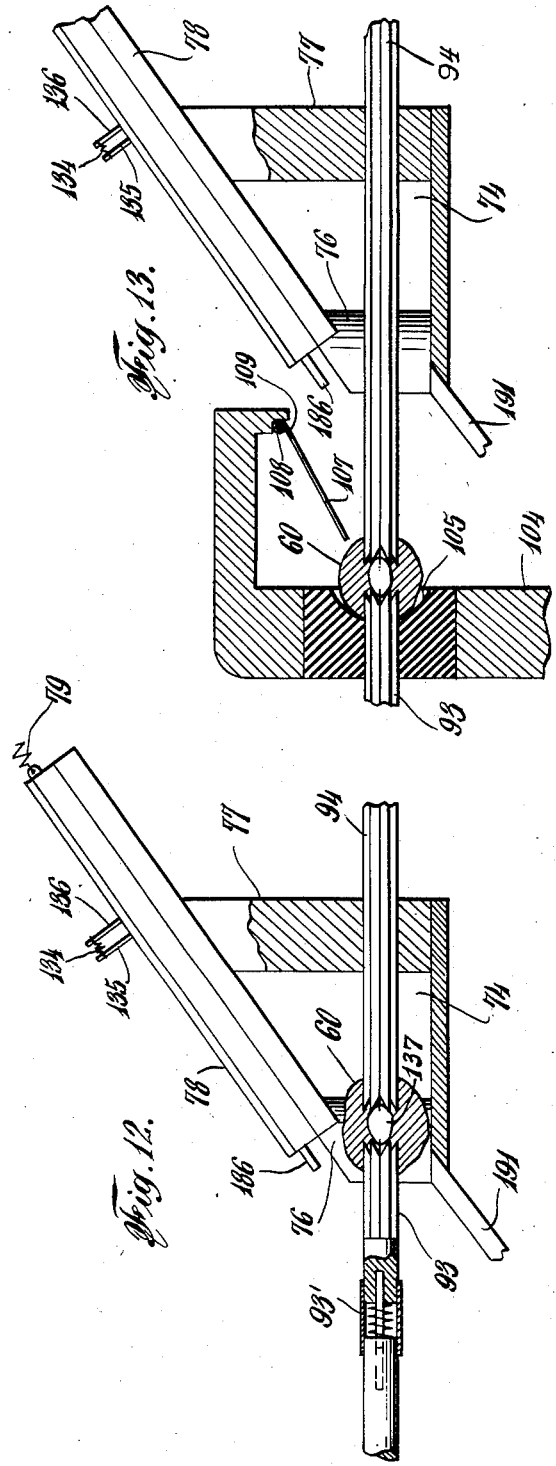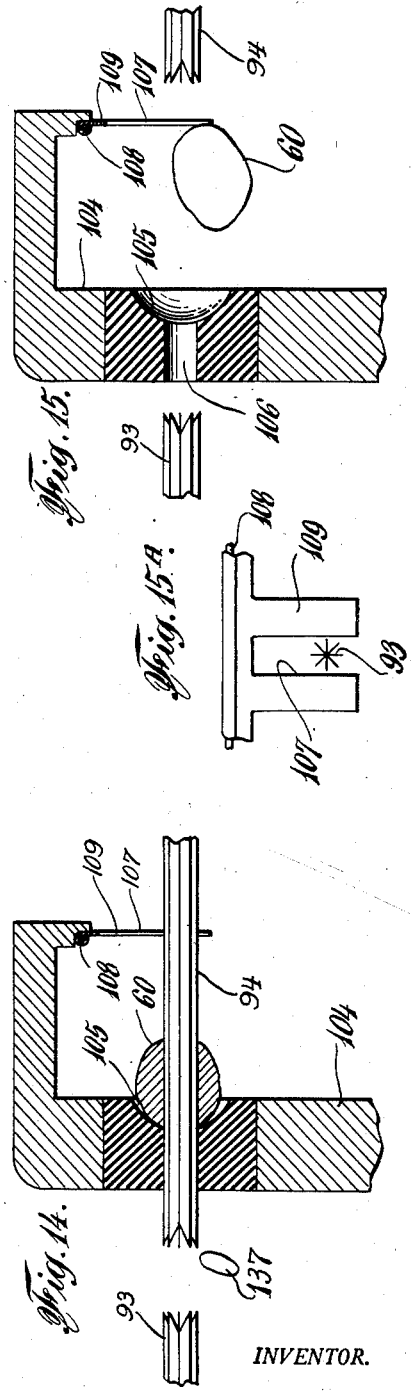

Oct. 31, 1944.   G. FROVA   2,361,834
AUTOMATIC APPARATUS FOR FEEDING, DESTEMMING
AND PITTING CHERRIES AND OTHER FRUITS
Filed Feb. 22, 1943    7 Sheets-Sheet 7
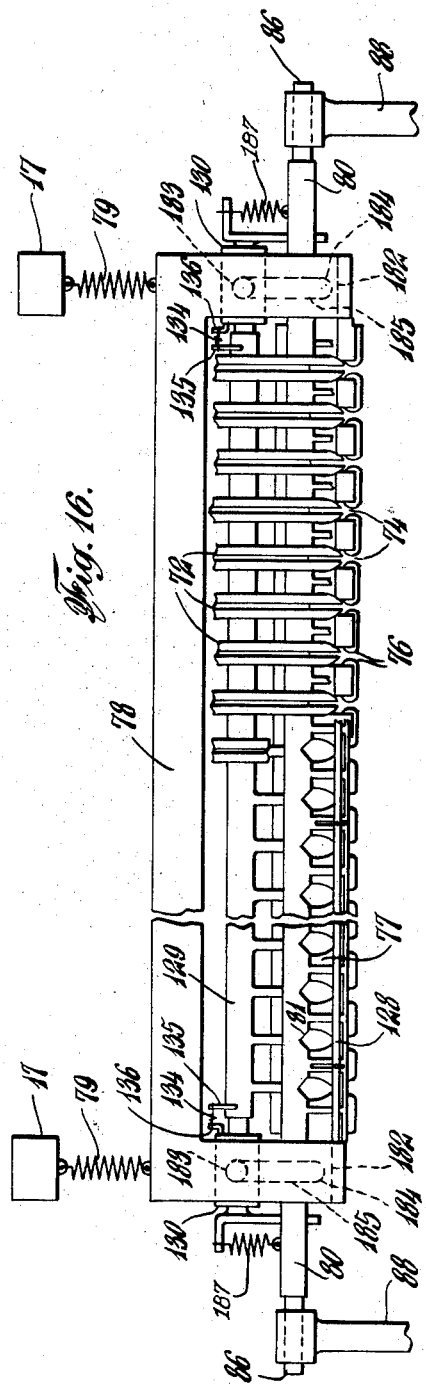
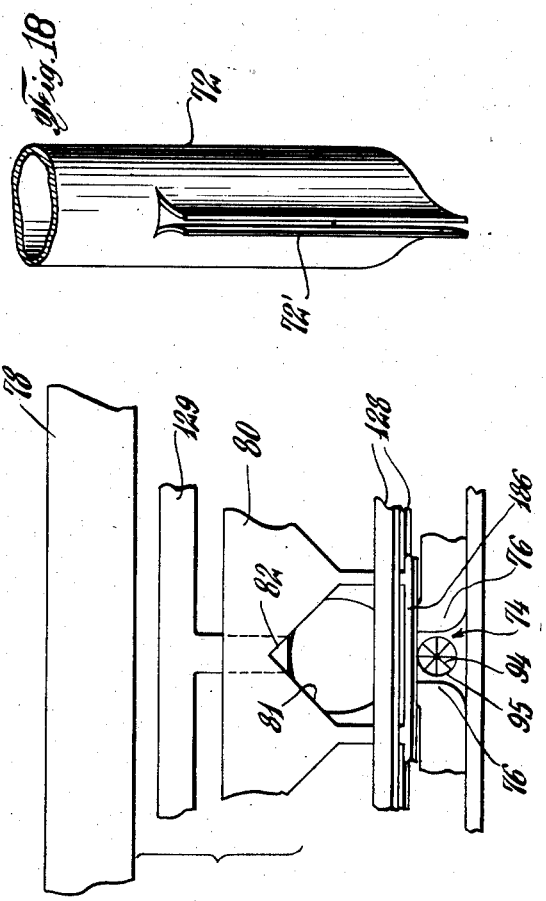
INVENTOR.
Giovanni Frova
BY
Haseltine, Lake & Co.
ATTORNEYS.

Patented Oct. 31, 1944

2,361,834

UNITED STATES PATENT OFFICE 2,361,834

AUTOMATIC APPARATUS FOR FEEDING, DESTEMMING, AND PITTING CHERRIES AND OTHER FRUITS

Giovanni Frova, Jackson Heights, N. Y.

Application February 22, 1943, Serial No. 476,702

17 Claims. (Cl. 146—19)

This invention relates to apparatus for de-clustering, feeding, de-stemming, pitting and finally delivering berries and fruits such as cherries, olives, etc.

This application is a continuation-in-part of my copending application, Serial No. 449,116, filed June 30, 1942.

The main object of my invention is to provide an efficiently combined apparatus capable of receiving cherries in clusters, for example, and not only separating the cherries in each cluster but using the individual stems of the separated cherries to dispose the latter by an intermediate operation in proper position for pitting out through the stem end of each cherry.

Another object is to have a combined apparatus which eliminates rehandling of the cherries after they are once introduced into said apparatus, so that the finally pitted stage is attained without lost motion and in the minimum amount of apparatus.

A further object is to have a compact apparatus for the present purpose which requires a minimum of attendants and occupies a minimum amount of floor space, while requiring a minimum outlay of funds for a maximum output of pitted and sorted cherries or other product of this class.

It is also an object to provide apparatus of this character indicated which is so positive and effective in its operations that only a very small percentage of the fruits or berries handled are injured, while the major portion is perfect and of the highest quality.

Other objects and the advantages of my invention and its actual use in practice will appear more fully in detail as this specification proceeds.

In order to bring out the salient features of the invention in comprehensible manner and to the best advantage, the same is illustrated in the accompanying drawings forming part hereof, in which:

Fig. 4 is an enlarged fragmentary sectional view of the right end or de-clustering portion of the drum surmounting the apparatus of Fig. 1.

Fig. 5 is a further enlarged view of a portion of the same apparatus shown in Fig. 3, illustrating one of a plurality of devices for catching and separating a cluster of cherries, preparatory to grading of the cherries in succeeding sections of the drum.

Fig. 6 is a detail section taken on line VI—VI in Fig. 4.

Fig. 7 is an enlarged fragmentary detail view of a feeder of the upper central portion of Fig. 3 with some parts removed and others in section to disclose the essential parts in initial position, with a cherry in place as first deposited, as partly fed forward and then finally released.

Figs. 8 through 15 are a series of views of de-stemming and pitting mechanism of the apparatus on the order of Fig. 5 to illustrate successive stages of operation in turning, stemming and pitting a cherry or the like. Fig. 15A is a detail.

Fig. 16 is an enlarged fragmentary side elevation of a portion of Fig. 1 with parts torn away to disclose detail.

Fig. 17 is a further enlarged view of a single de-stemming device of Figs. 8–16 as seen from the left in said figures.

Fig. 18 is a perspective view of a portion of one of the feed tubes of Figs. 2, 3 and 8.

Throughout the views, the same references indicate the same or like parts.

Figure 1:
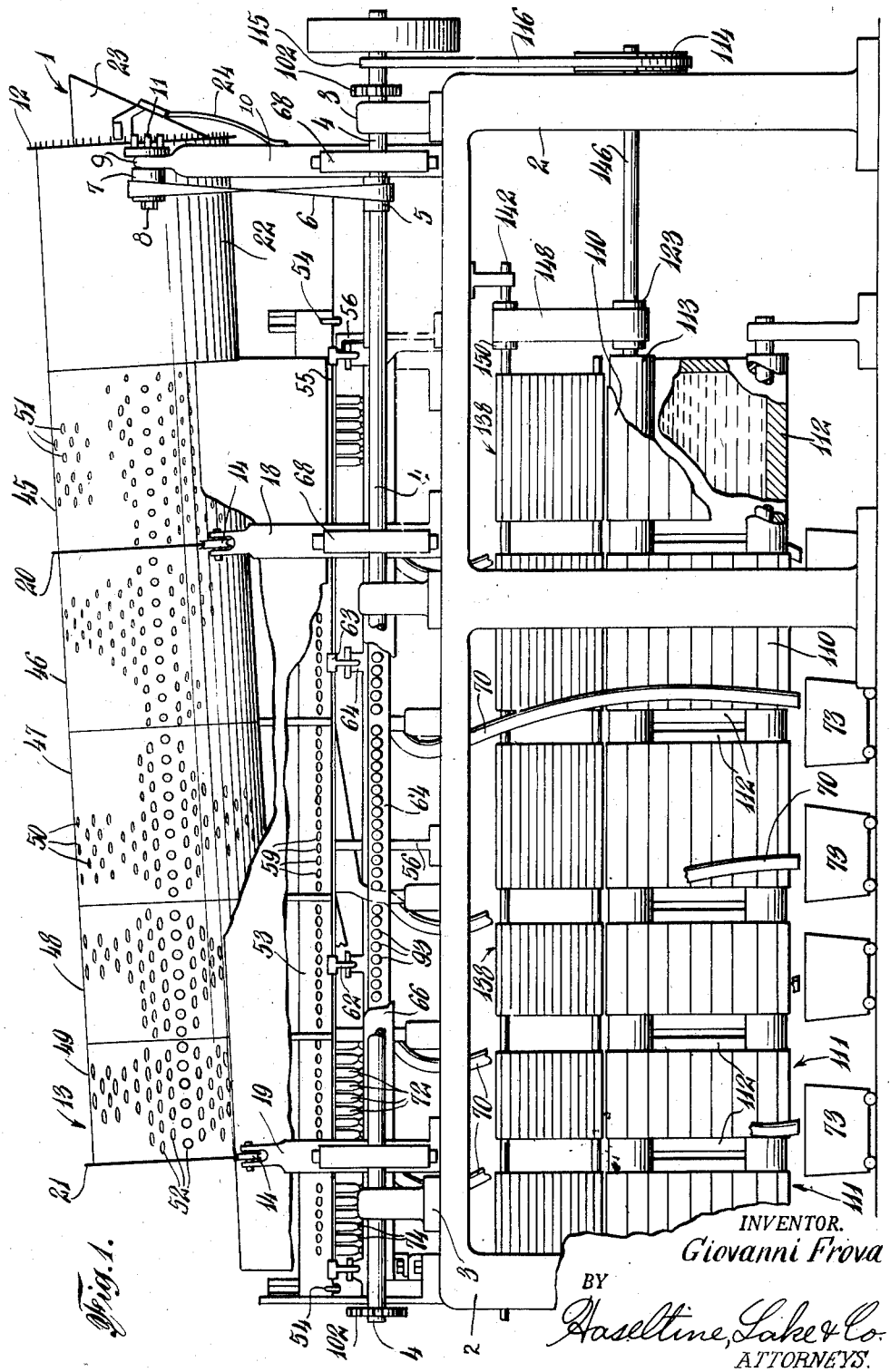
Fig. 1 is a side elevation of a machine embodying the invention in practical form and exhibiting the features and advantages thereof.
Figure 2:
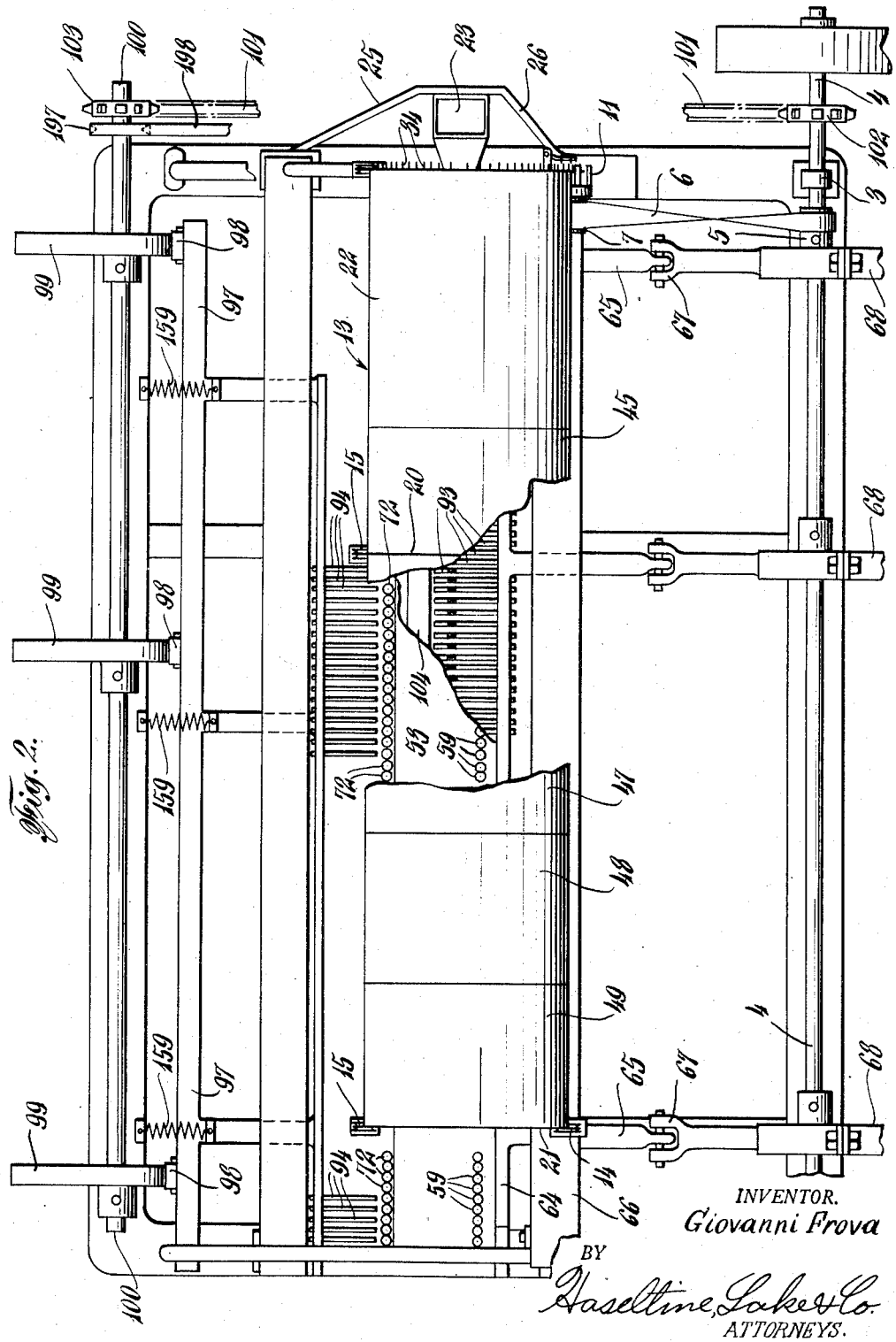
Fig. 2 is a top plan view of the same.

In the fruit and berry handling art, and particularly in apparatus for handling such berries and fruits as cherries and the like, certain operations have heretofore been carried out by hand while others have been effected by separate machines. This has entailed repeated rehandling of the cherries at various stages and the use of a considerable number of attendants. This involves expense, inconvenience, and the use of a great amount of floor space, all of which greatly increases the cost of the final product.

In order to overcome these disadvantages, and particularly with the foregoing objects in view it is now proposed to carry out in a combined machine the entire group of operations required to pit and deliver cherries and the like from the original clusters.

Hence, referring now again to the drawings in Figs. 1 to 5, a fruit or berry handling machine, generally indicated at 1 has a main frame 2 upon which are fixed bearings 3, 3 for a main drive shaft 4 (driven by a motor or other means not shown) having a pulley 5 fixed thereon and connected by a belt 6 to a pulley 7 on one end of a second shaft 8 supported in bearing 9 on post 10 secured on the frame 2. On the other end of this shaft 8 is fixed a stud pinion 11 meshing with a ring gear 12 on the periphery at one end of a grading drum generally indicated at 13. This drum is supported in inclined position upon a group of grooved rollers 14, 15, etc., carried on an arm 16 on a second post 17 and on further supports 18, 19, etc., on the machine frame, the drum having spaced peripheral rails 20, 21, etc., riding in the grooves of the rollers and thereby locating said drum in position while allowing the same to rotate on said rollers.

Forming the first or introductory portion of drum 13 is a de-clustering section 22 which is located at the higher end of the drum, immediately within a hopper 23 supported closely adjacent said end of the drum by a bracket 24 secured to post 10 and by an extension 25 upon the second post 17 already mentioned.

A further bracket 26 extends from the hopper toward the edge of the drum and meets with an upward extension 27 upon post 10 in order to support a stationary bracket 28 which has an upper cutting blade 29 extending horizontally toward the periphery of the drum and a movable knife or cutter 30 dove-tailed at 31, 32 to the first blades so as to be slidable with respect to the same in the axial direction of the drum. In order to operate the cutter constituting this construction, the edge 33 of the de-clustering portion of the drum has a series of projections 34, 34 which during rotation of the drum as a whole engage with a finger 35 fixed on a rocking shaft 36 mounted in bearings 37, 37 on a bracket 28 and carrying at the other end an arm 38 having a pin 39 projecting into vertical slots 40, 40 in the lugs 41 fixed to the lower portion of the cutter or blade 30. When the cutter has been operated in one direction to cooperate with the upper cutter 29 so as to shear off the branch connection between the stems in the cluster of cherries by contact of finger 35 with a drum projection 34, a return spring 42 attached to the lower portion of plate 30 at one end and at the other end to a post 43 on bracket 28 will cause the cutters to separate ready for the next cutting operation. As best seen in Fig. 4, each cuter member is comb-shaped, the movement being limited by, and the cutters further retained in association by retaining studs 84 on the lower fixed cutter plate 30 extending up through operating slots 85 in the upper movable cutter member 29.

In order to cooperate with the cutters, a group of rigid arms 44 extend radially inward from the interior of the de-clustering section of the drum and are so disposed that each group is arranged along a line upon the drum in parallelism with the axis thereof within each one of the projections 34. These arms serve to pick up individual clusters of cherries and expose the stems of the same at the proper moment to the cutters 29 and 30 when they are temporarily open, so that the connection between the stems in each cluster will be snipped off by the closing of the cutters. When the stems of the cherries have thus been separated, the latter with their individual stems intact will gradually feed down along the grading sections 45 to 49, due to the rotation of the latter and slight inclination of the same, so that the cherries will travel within said drum until the section is reached wherein the holes 50, etc., are sufficiently large to allow these cherries to drop through. As grading drums for various purposes are well known, it will suffice to mention that in this section 45 the holes 51 are the smallest in the series, while the holes or apertures in the succeeding sections are increasingly larger with the holes 52 in section 49 largest of all. It may be added that the apertures in the grading sections are, of course, placed in regular lines about the drum so that the fruit dropping through the same will fall upon a series of predetermined points of a slidable reciprocating feed plate 53 having rollers 54 resting upon a supporting plate 55 supported upon posts 56 and 17. Below the drum an apron 57 and a stem retainer 58 have the upper surfaces inclined in converging manner generally toward the initial location of row of apertures 59 in the feed plate serving to catch falling cherries 60 therein. It may be stated that always the cherries 60 will fall in such position that when they drop into apertures 59 in the mentioned feed plate their stems 61 will be directed generally upward. To the lower end of the feed plate is connected a link 62 at 63 which in turn is connected to and driven by a bar 64 fixed upon a sliding shaft 65 supported in a bearing 66 in post 10 while a cross head 67 connects said shaft with an eccentric ring 68 mounted upon an eccentric 69 fixed on drive shaft 4.

From the foregoing it is clear that upon rotation of the drive shaft the eccentric 69 will cause shaft 65 to reciprocate in bearing 66, and thus through bar 64, and link 62, drive the feed plate 53 upwardly along the support 55 until apertures 59 will register with the upper end of a row of tubes 70 which open in predetermined position through support plate 55. However, when the cherries have been brought part of the distance toward these tubes, the stems thereof will make contact with an entrance portion beneath stem retainer 58 which will tend to turn down the stem due to the movement of the feed plate 53 and wipe said stems under said stem retainer, so that each cherry that has a stem is virtually suspended upon the feed plate by the stem above the corresponding tube 70 during movement of this feed plate until said plate has moved the cherry beyond said tube 70 to one of a series of rear feed tubes 72. Any excess cherries upon the plate above the one deposited in cherry aperture 59 will be brushed off by the downwardly directed brushes 71 mounted at the entrance portion of the stem retainer, and due to the sharp inclination of the feed plate, such excess cherries will roll back to the initial position of the cherry aperture, ready to drop into the same during a succeeding cycle of operation of the feed plate. The cherries having stems will thus be carried by the feed plate past tube 70, but should any cherry have lost its stem, the stem retainer 58 will not operate to suspend the cherry in the aperture 59, but said cherry will instead drop from said aperture down through tube 70 to a collector 73 below the machine. At a point approximately above tube 70, the stem retainer terminates so that when the cherries which have been carried past tube 70 reach tube 72, the stem retainer no longer retains the stems lying upon feed plate 53, but frees the same so that these cherries may drop individually in said tubes 72, down into individual troughs 74 in a trough member 77 forming part of a de-stemming device generally indicated at 75, each trough having resilient rubber side walls 76, 76 for gently retaining the cherry in central position within the trough, the troughs in each case being open in front and above.

The lower end of each of the feed tubes 72 preferably terminates a short distance above the fixed trough member 77 forming the backing of the resilient walls 76, 76 while between said lower end and said walls is located a slidable open frame 78 supported upon these walls and disposed in an inclined position for a reason that will immediately appear. As the frame 78 is slidable downward in inclined direction in order to function, the same has retaining springs 79, 79 secured thereto and anchored to the posts 17, etc., of the machine in order to prevent downward movement of said frame until the same positively operated, as may be seen in Figs. 3, 8 and 16. Slidably associated with the mentioned frame is a de-stemming plate 80 which has a peaked opening 81 arranged substantially above each trough, while the peak or apex 82 is located centrally with respect to the trough walls so that the opening will be symmetrical with the corresponding feed tube 72 in each case. The plate 80 is arranged to slide in side slots 83 in frame 78, which terminate at 182, 182 to form stops for plate 80 against which the plate will engage to operate and move said frame positively and bring the same down into a final position shown in Figs. 10 and 11. It is, of course, intended that the openings 81 in plate 80 shall register with the corresponding feed tubes and troughs, the latter as a group on trough member 77 being rigidly mounted on a pedestal 86 fixed on the frame of the machine.

It may be mentioned here that, as will presently be described, the movement of plate 80 will direct or bend the stem 61 of each cherry forward or out from its respective trough, and in order to provide clearance for long stems, each feed tube 72 (Fig. 18) has a pair of vertical projecting front lips or edges 72' spaced apart to allow such stems to be drawn forward freely without meeting any obstruction.

At the ends of plate 80 are secured pivot pins 86, 86 projecting into slots 87 in levers 88, 88 pivoted intermediate their extremities at 89 to fixed portions of the machine, as for example to the trough member 77. To the other ends of these levers are connected further levers 90 (Fig. 3) pivoted at 91 and in turn connected at their lower ends to the rear ends of long links 92, the latter being pivotally connected at their forward ends to the bar 64 reciprocated by the eccentric as already described. Upon this bar are also mounted a series of pit punches 93 directed rearwardly toward the trough member 77, while rearwardly of said latter member are a second series of pit punches 94 entering the individual troughs through rear apertures 95, while being slidably supported in bearings 96. The last mentioned punches 94 are connected to a bar 97 and cam rollers 98 operating on cams 99 fixed to shaft 100 rotated in synchronism with shaft 4 by means of a chain 101 engaging with sprockets 102, 103 fixed upon shafts 4 and 100 respectively. A short distance in front of the trough member 77 is a stop member 104 with a cavity 105 facing the troughs 74, 74 and having apertures 106 through which punches 93 may be projected during operation. Between the cavities 105 and the troughs is a forked gate means 107 swingably suspended upon member 104 at 108, there being a downwardly open slot in said member 107 for each trough through which the corresponding forward and rear punches may project. Below the trough member 77 and stop member 104 is a chute 181 through which pitted cherries are intended to fall from the space between the trough member and the stop member, said chute extending down to a raised horizontal portion 110 of a conveyor generally indicated at 111 operating with portions thereof in a water tank 112 and driven by a roller 113 rotated by a pulley 114 from a pulley 115 through a belt 116. While the tank is shown as disposed beneath the machine, the rear portion thereof is intended to be sufficiently extended to project beyond the rear posts 117 of the machine frame 2.

The upper horizontal portion 110 of the conveyor operates at slightly higher level than the level 118 of the water in tank 112, while an inclined partition 119 extends downwardly from a short distance below the water level at the entrance portion of the tank toward the outlet portion in the rear, while a downwardly extending portion 120 and a lower horizontal portion 121 of the conveyor pass beneath said partition and beyond the rear lower end thereof, the upwardly inclined portion 122 of the conveyor rises to pass over roller 123 and then down at 124 and beneath the tank at 125 and thence up again at 126 over roller 113.

Figure 3:
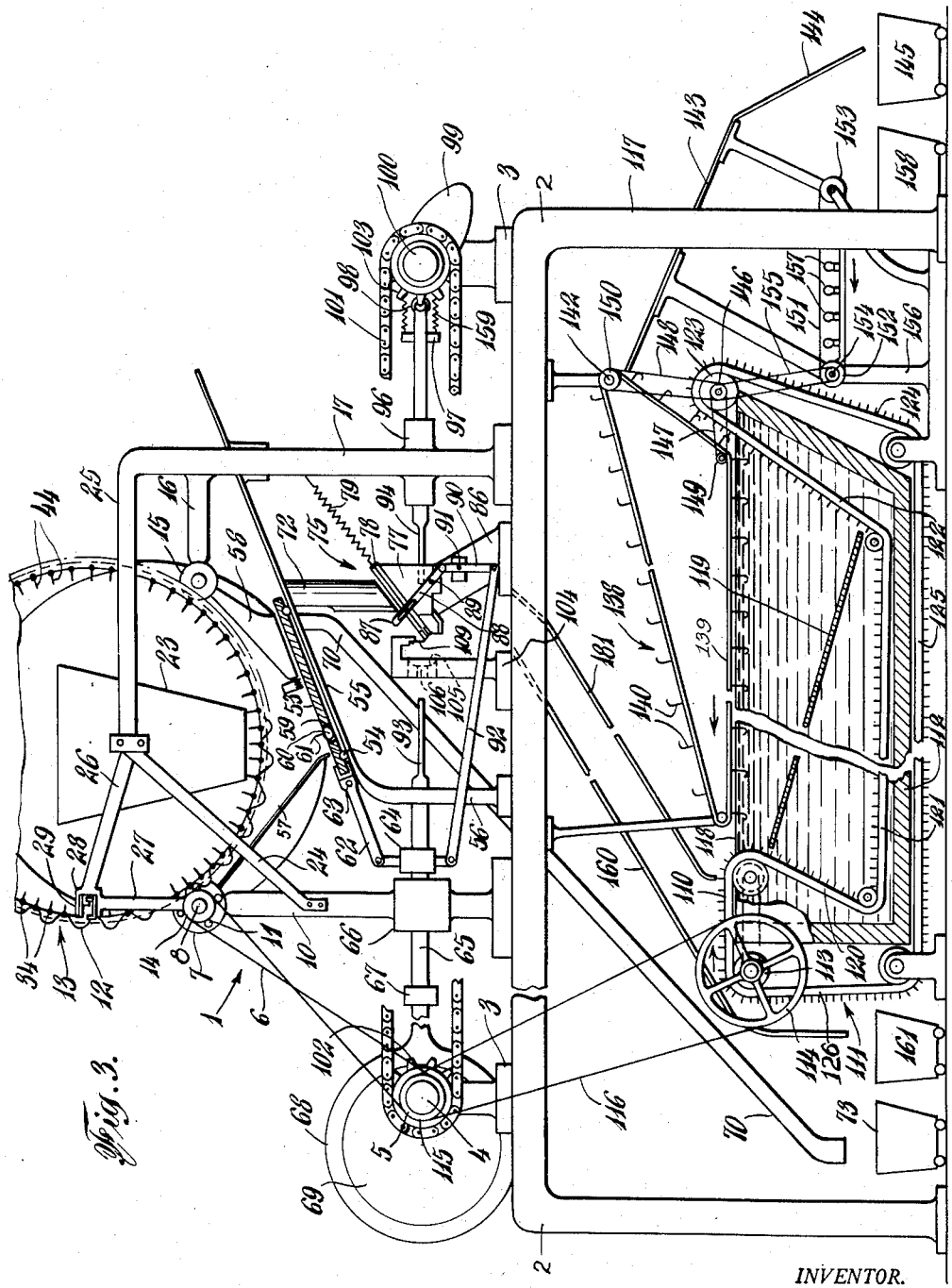
Fig. 3 is an end elevation of the machine as seen from the right in Fig. 1.

Following the cycle of operations in even better detail from the hopper 23 to the conveyor 111, it may be assumed that a more or less continuous supply of clusters of cherries are fed to the hopper whence the clusters feed in by gravity from said hopper 23 to the interior of the de-clustering section 22 of the grading drum 13, the latter being rotated clockwise in Figure 3. The clusters are picked up by the inwardly extending pins or arms 44 and as each cluster is caused to pass the bracket 28 and the cutters 29 and 30, the cutter 30 being operated through arm 38, rocking shaft 36 and contact of finger 35 on said shaft with projection 34 on the drum.

As shown in Figure 5 the connecting branch portion 127 of the cherries 60 will be cut off from the stems 61 while said branch portion is momentarily held on the arm 44 when the cherries will drop to the drum in separated condition. These cherries then gradually roll inward from the de-clustering section into the grading sections 45 to 49 to drop through the apertures 50, 51, and 52 as the case may be according to their sizes, and thence into the apertures 59 of feed plate 53 reciprocated from eccentric 69 through bar 64 and link 62, when these cherries will be passed to and drop into feed tubes 72 and deposited in troughs 74 as shown in Figure 8. As diagrammatically shown in Figures 9 through 11, etc., when the cherries have reached the troughs, the apertured plate 80 will be drawn down over the cherries in the troughs by levers 88 through further levers 90 and links 92 so that the stems of the cherries will be centered in the upper apices 82 of the peaked apertures 81 in the plate 80 will engage the lower ends 182 of slots 83, 83 in slidable frame 78 to draw the same positively downward upon the walls of the troughs, the apex portions of the peaked apertures of plate 80 pinching the stems against the lower edges 128 and turning the cherries by means of their stems to face punches 93 and drawing the same forward between resilient side walls 76, 76. During the downward movement of the slidable frame a rockable cherry holder 129 pivoted at each end in a block 130 slidably mounted in the slidable frame 78 will come into play. First by contact of a downward stop projection 183 on block 130 with the lower end or stop 184 in slot 185 in trough member 77 the block will come to a stop while at the same time a rear finger 131 rigidly associated with holder 129 will meet a fixed stop 132 on the machine causing the main portion 129 thereof to swing down against the cherry, preventing the same from being pulled out of the trough. While member 129 thus holds the cherry 60 in place the plate 80 and slidable frame 78 continue moving downwardly in inclined direction and due to the fact that the stem 61 in each case is pinched between the apex portion 82 (Fig. 17) of the plate 80 and the edges 128 of the slidable frame, said stem is pulled free from the cherry as shown in Fig. 10. In this position the plate is in its lowest position with the lower portions 186 thereof projecting a distance beyond the slidable frame 78, said lower portions forming stem strippers as will immediately be explained. The blocks 130 just mentioned when stopped against the lower end 184 of slots 185 will not prevent the slidable frame or the plate from continuing as the only actual connection between the two is one or a group of springs 187 which tend to draw the block 130 down close to the plate. Stripper portions 186 of the plate will upon rear movement of the latter pass between the edges 128 and strip away the stems 61 which may remain between said edges while upwardly directed brushes 133 tend to engage the released stems and prevent the same from following any of the parts upon the slidable frame in the upward rear movement, but will rather cause the stems to remain behind and drop down from the brushes to be discarded as partly shown in Fig. 11.

When slidable frame 78 approaches its lowest limit of movement a projection 188 on the lowest portion thereof will engage a resilient pivoted stop 189 and by virtue of the spring 190 connected to one end of said pivoted stop and the bracket 191 projecting forwardly from trough member 77 so that said resilient stop will snap past the frame stop 188 and tend to partly impede or delay return movement of the frame upwardly upon the trough member. The effect of the break or stop thus described is to provide a sufficient time for the return upward of the de-stemming device and allow the stems to be stripped from between edges 128 before the slidable frame again returns upward to initial position. During return movement of frame 78 the return finger 131 of cherry holder 129 is of course removed from contact with fixed stop 132 and block stop 183 from contact with end stop 184, which allows a spring 134 to draw the upper projection 135 of member 129 toward the lug 136 fixed upon block 130 thus swinging member 129 up and away from the cherry.

With the cherries in place as just described, the rotation of eccentric 69 and simultaneously cam 99 the punches 93 are caused to pass through apertures 106 in stop 104 to meet with the pit 137 within the cherry 60, and simultaneously punches 94 engage the pit from the opposite side as particularly shown in Figure 12, after which rotation of the cam 99 and eccentric 69 will cause the cherry thus impaled upon both forward and rear punches to be moved from its trough to pass gate 109 into cavity or channel 105, the gate once passed swinging down beyond the cherry as shown in Figure 13. At this moment each punch 94 continues through the aperture 106 in stop 104, while the cherry 60 remains in cavity 105, the stop plate virtually acting as a die plate for the cherry, while the punch pushes the pit 137 out through said aperture and down upon the outer or forward side of the stop as particularly shown in Figure 14. Inasmuch as stones or pits in cherries vary in size, the punches 93 and 94 are, of course provided with means for resiliently compensating for such differences and avoiding crushing or breakage of the pits. Thus, the punches 93 have a resilient spring take up portion 93' of more or less conventional construction which allows these punches to yield a little for larger sizes of pits and to project further for smaller pits. When the punch 93 and also punch 94 is withdrawn, as shown in Figure 15, the cherry is withdrawn against gate 109 by punch 94 but is stopped by said gate so that the punch is fully withdrawn from the cherry 60, thus freeing the latter to fall down into chute 181 when the members already described will be immediately ready for another cycle with fresh cherries just dropped from the grading drum.

As already mentioned the horizontal upper portion 110 of the conveyor 111 receives the pitted cherries from the chute 181 and as this operates toward the right in Figure 3 indicated by the arrow within pulley 114 these cherries are fed to the surface 118 of the water upon which all sound pitted cherries will float toward the rear roller 123 above the rear end of the water tank 112. However, a counter-conveyor 138 operating toward the left as indicated by the arrow above the horizontal portion 139 in Figure 3 would by virtue of its hooks 140 pick up the floating sound cherries and convey the same upwardly upon its inclined upper stretch toward roller 142 at which point these cherries will be released upon an inclined table 143 having a lower apron 144 allowing the cherries to slide down into a cart 145 for collecting the same. In order to operate conveyor 138, the roller 123 has a pulley 146 provided with belts 147, 148 rotating roller 149 and pulley 150 of roller 142, the roller 123 being of course operated by the conveyor belt 111. Perfect pitted cherries are light and therefore float in water, while broken ones sink, the perfect cherries containing air.

During operation it is possible that some cherries are of such unusual form or have defects so that when they are passed through the machine they are either mutilated and broken or perhaps missed by the punches so that they are not properly pitted, and all such cherries as they fall through chute 181 will upon being deposited upon the water at 118 immediately sink down to partition 119 and gravitate toward the lower end thereof, at which point they will be caught by the upwardly traveling portion 122 of the conveyor and brought over roller 123 and deposited upon a horizontal belt 151 which is preferably made of translucent or transparent material, for example, of cellulose acetate or a derivative thereof, or even a plastic of the vinyl series. This conveyor operates upon a pair of rollers 152, 153, the first having a pulley 154 connected to a pulley 146 of roller 123 by means of a belt 155, the rollers 152 and 153 being supported upon a frame 156, while within the belt is a series of electric lights 157 illuminating said belt from within so that cherries carried forward on said belt in the direction of the arrow immediately above same will be readily inspected by an operator inspecting said belt to discover cherries which still retain their pits. Such cherries will easily be seen because they will be relatively opaque, while the pitted cherries will be translucent. The unpitted cherries can thus be easily picked off and disposed of, while the broken cherries will continue along the belt and drop into collector cart 158.

While variations may be resorted to and parts may be used without others, or be replaced by others of modified form, it is quite evident that if clusters of cherries are fed to the hopper 23, unpitted cherries having no stems will be dropped through tube 70 into the collector cart 73, the pits dropped upon the upper portion or roof 160 of the chute 181 to fall into a collector cart 161, while the perfect pitted cherries will be collected in collector cart 145 and the broken cherries in cart 158, and the operation will be continuous and wholly automatic throughout. In this connection it is to be noted that the machine is suitable not only for pitting cherries, but also for pitting plums, apricots and other freestone fruits and berries, particularly such as have stems.

From the foregoing it is clear that a group of operations are performed by the machine without necessarily including any hand labor for transferring separated cherries to any de-stemming apparatus or the de-stemmed cherries to pitting apparatus, etc., but rather all operations succeed each other rapidly and automatically in order so that a constant supply of clusters of cherries or other fruit to the hopper 23 will produce a supply of pitted cherries or other fruits in the collecting carts upon the floor level below the machine, while stems and pits, etc., and broken fruit will be segregated.

Having now fully described my invention, I claim:

1. Apparatus for pitting cherries, apricots, plums and other fruits and berries, including a trough member containing one or more troughs for receiving individual fruits, means for delivering the fruits to said troughs comprising a slidably mounted plate having fruit receiving apertures therein, means for reciprocating said plate above said trough member, a support for said plate having delivery apertures therein connected individually to the troughs, said plate in movement causing the apertures therein to register with the delivery apertures in the support, one or more pit punches disposed upon one side of said trough member capable of being moved through apertures into the trough member and through the troughs therein toward the other side of said trough member, a fixed stop spaced from said other side of the trough member with apertures in line with said pit punch or punches and effective to hold the fruit when the punch or punches push the pits through said apertures, and pendantly mounted gate means suspended from a portion of said stop in the path of the fruit toward the aperture in the stop and disposed at a sufficient distance from said aperture to allow the gate means to swing down behind the fruit when the punch or punches have brought the same into contact with the stop, said gate means being effective to prevent the return of the fruit to the troughs when the punch or punches are withdrawn from said stop in order to strip the pitted fruit from said punch or punches and allow the same to drop between the gate means and the aperture in the stop for delivery of said fruit.

2. Apparatus for pitting cherries, apricots plums and other fruits and berries, including a trough member containing one or more troughs for receiving individual fruits, means for delivering the fruits to said troughs comprising a slidably mounted plate having fruit receiving apertures therein, means for reciprocating said plate above said trough member, a support for said plate having delivery apertures therein connected individually to the troughs, said plate in movement causing the apertures therein to register with the delivery apertures in the support, one or more pit punches disposed upon one side of said trough member capable of being moved through apertures into the trough member and through the troughs therein toward the other side of said trough member, a fixed stop spaced from said other side of the trough member with one or more corresponding apetures in line with said pit punch or punches and effective to hold the fruit when the punch or punches push the pits through said apertures, resiliently yielding side walls mounted in the forward portions of each trough for resiliently holding the fruit centrally in the entrance portion of the trough, and means for moving the fruits from within the troughs to an effective pitting position between the resilient walls thereof.

3. Apparatus for pitting cherries, apricots, plums and other fruits and berries, including a trough member containing one or more troughs for receiving individual fruits, means for delivering the fruits to said troughs comprising a slidably mounted plate having fruit receiving apertures therein, means for reciprocating said plate above said trough member, a support for said plate having delivery apertures therein connected individually to the troughs, said plate in movement causing the apertures therein to register with the delivery apertures in the support, one or more pit punches disposed upon one side of said trough member capable of being moved through one or more corresponding apertures into the trough member and through the troughs therein toward the other side of said trough member, a fixed stop spaced from said other side of the trough member with one or more apertures in line with said pit punch or punches and effective to hold the fruit when the punch or punches push the pits through said aperture or apertures, pendantly mounted gate means suspended from a portion of said stop in the path of the fruit toward the aperture in the stop and disposed at a sufficient distance from said aperture to allow the gate means to swing down behind the fruit when the punch or punches have brought the same into contact with the stop, said gate means being effective to prevent the return of the fruit to the troughs when the punch or punches are withdrawn from said stop in order to strip the pitted fruit from said punch or punches and allow the same to drop between the gate means and the aperture in the stop for delivery of said fruit, one or more additional punches capable of moving in line with the first mentioned punch or punches and being disposed opposite the same, a resilient take-up means associated with the first or additional punch or punches to allow for different sizes of pits in the fruits to be pitted, and drive means for bringing the first or additional punches together upon the pits in the fruits located between the side walls of the troughs so as to clamp the pit between them and thereafter moving both the first and additional punches with the fruits to the stop and further moving the first and additional punches so as to bring the pits through the stop and allowing the same to drop therefrom.

4. Apparatus for pitting cherries, apricots, plums and other fruits and berries, including a trough member containing one or more troughs for receiving individual fruits, means for delivering the fruits to said troughs comprising a slidably mounted plate having fruit receiving apertures therein, means for reciprocating said plate above said trough member, a support for said plate having delivery apertures therein connected individually to the troughs, said plate in movement causing the apertures therein to register with the delivery apertures in the support, one or more pit punches disposed upon one side of said trough member capable of being moved through one or more corresponding apertures into the trough member and through the troughs therein toward the other side of said trough member, a fixed stop spaced from said other side of the trough member with one or more apertures in line with said pit punch or punches and effective to hold the fruit when the punch or punches push the pits through said aperture or apertures, pendently mounted gate means suspended from a portion of said stop in the path of the fruit toward the aperture in the stop and disposed at a sufficient distance from said aperture to allow the gate means to swing down behind the fruit when the punch or punches have brought the same into contact with the stop, said gate means being effective to prevent the return of the fruit to the troughs when the punch or punches are withdrawn from said stop in order to strip the pitted fruit from said punch or punches and allow the same to drop between the gate means and the aperture in the stop for delivery of said fruit, the stop having in each case a concave portion associated with each of the one or more apertures therein to conform at least partly with the rounded shape of the fruits to be pitted, while the gate means includes a pair of downward projections forming a forked section symmetrically disposed before each trough in a position allowing the punch associated therewith to pass between the downward projections in each pair.

5. Apparatus for de-stemming cherries and other fruits and berries in which the stems are intended to be removed preparatory to pitting the fruits, including a stationary support means, a series of hollow troughs upon said support means with open front portions, pitting punches individually movable toward said troughs, means for feeding the fruits individually to said troughs, means for moving a portion of the stem of the fruit in each trough toward the front portion of the latter and seizing said portion of the stem and also for turning and drawing the fruit by its stem toward the front portion to align said fruits with said pitting punches and means operable adjacent to each trough for thereafter pulling off the stem, movable means for temporarily obstructing the fruit in each trough when the fruit has reached a predetermined position in the front portion thereof, and means for operating the punches for pitting the fruit after the latter has been de-stemmed.

6. Apparatus for de-stemming cherries and other fruits and berries in which the stems are intended to be removed preparatory to pitting the fruits, including a series of hollow trough means being open in front, a stationary support therefor, means for pitting said fruits when located in the trough means including movable punches operating through said trough means, means for feeding the fruits individually to said trough means with the stems directed upwardly, a frame member slidably mounted upon said trough means, means for sliding said frame member toward the front portion of the latter, a plate member slidably mounted on said frame member having means cooperating with said frame members to pinch portions of the stems of the fruits and both turning said fruits and bringing the same forward to the front portions of the trough means to align said fruits with the pitting punches and then pulling off said stems in order to remove the latter from the path of the punches entering the troughs from the front thereof, a stationary stop in the path of each punch, a movable stop means shiftably mounted upon said frame member having a stop portion capable of moving into the path of the fruit to temporarily stop the same in predetermined positions in said trough means and also having a contact portion capable of engaging against said stationary stop along the path of movement of said frame member and thereby cause shifting of said stop portion to stop the fruit and allow the stem to be pulled off, and means for sliding said plate member and frame member.

7. Apparatus according to claim 6, including inclined top portions upon the trough means sloping down toward the open front portions thereof, a pair of converging edges upon the slidable plate member constituting a portion for centering and engaging a fruit stem in each trough means as well as for engaging the fruit stem during movement against the frame member in order to move and operate the latter, a pair of spaced edge portions upon the frame member cooperating with the centering portion of the plate in association with each trough means constituting the means for pinching and pulling off the stem of the fruit therein, bearing blocks slidably mounted in the slidable frame member for the movable stop means, stops upon the trough means limiting movement of said bearing blocks with the frame member, resilient means connecting the frame member and the bearing blocks, resilient means connected to the frame member and to stationary portions of the apparatus tending to resist forward and downward movement of said frame member upon the trough means, and a stripper portion upon the plate member for stripping the stem from the two edge portions upon the frame member adjacent to each trough means during upward return movement of the plate member and then also the frame member upon said trough means.

8. Apparatus according to claim 6, including stop means upon the frame member disposed in the path of movement of the plate member, drive means for the apparatus, levers fulcrumed on stationary portions upon said apparatus with one end of each connected to said plate member, additional levers connected to the other ends of the first mentioned levers and also fulcrumed on stationary portions of the apparatus, and links connected to the latter levers and oscillated from the drive means.

9. Apparatus for distributing and disposing individual cherries for pitting said cherries, including a stationary support means having a series of troughs for receiving individual fruits, means for delivering the fruits to said troughs comprising a slidably mounted plate having fruit receiving apertures therein, means for reciprocating said plate above said trough member, a support for said plate having delivery apertures therein connected individually to the troughs, said plate in movement causing the apertures therein to register with the delivery apertures in the support, one or more pit punches disposed upon one side of said trough member capable of being moved through one or more corresponding apertures into the trough member and through a corresponding trough therein toward the other side of said trough member, a fixed stop spaced from said other side of the trough member with one or more apertures in line with said pit punch or punches and effective to hold the fruit when the punch or punches push the pits through said one more apertures, and pendently mounted gate means suspended from a portion of said stop in the path of the fruit toward the aperture in the stop and disposed at a sufficient distance from said aperture to allow the gate means to swing down behind the fruit when the punch or punches have brought the same into contact with the stop, said gate means being effective to prevent the return of the fruit to the corresponding trough when the punch involved is withdrawn from said stop in order to strip the pitted fruit from said punch and allow the same to drop between the gate means and the aperture in the stop for delivery of said fruit.

10. Apparatus for distributing and disposing individual cherries for de-stemming and pitting said cherries, including a stationary support means, a series of hollow stationary troughs upon said support means arranged in a row with open front portions, means for feeding the fruits individually to said troughs, means for moving a portion of the stem of the fruit in each trough toward the front portion of the latter in position for pitting and seizing said portion of the stem and also for turning said fruit in situ and drawing the fruit by its stem toward the front portion and thereafter pulling off the stem, movable means for temporarily obstructing the fruit in each trough when the fruit has attained a predetermined position in the front portion thereof, and means for pitting the fruit in said attained position after the same has been de-stemmed.

11. Apparatus for pitting cherries, olives, apricots, plums and other fruits and berries, including means for holding the fruits individually in effective position for initiating the pitting thereof, one or more pitting punches capable of cutting into the fruits from one end of each without removing the flesh thereof but solely engaging against the pits therein, one or more additional pitting punches axially substantially opposite the first mentioned one or more punches and capable of cutting into the fruits from opposite end of each and also engaging with the pits therein without removing the flesh of said fruits, means causing both the first mentioned and additional pitting punches to cooperate and grip the pits between them and together remove said pits from the fruits while the latter are held stationary and the pits are gripped between the opposite punches, and stop means for holding said fruits stationary while said pitting punches are withdrawn from the fruits and allowing the latter to close with a minimum of injury to the same in perfect pitted condition, said punches consisting of cutting blades penetrating the fruits by slitting the latter.

12. Apparatus according to claim 11, wherein the cutting blades of the pitting punches are disposed radially with respect to the common axis of each punch in order to allow the same to merely to cut into the fruits without removing any of the flesh thereof while positively removing the pits from within the said fruits with a minimum of injury thereto and allowing the same to close at the cut ends of the same.

13. Apparatus according to claim 11, wherein one of the pitting punches comprises two portions, a pitting portion axially slidably mounted with respect to a rear portion, and springs interposed between the rear and pitting portion of said punch causing the pitting portion to be resiliently adjustable to the various sizes of pits of the fruits pitted and capable of cooperating with the one or more punches of the opposite group to hold the pits resiliently between them during operation until said punches are drawn apart, and wherein means are included for operating the punches and drawing them apart.

14. Apparatus according to claim 11, wherein the cutting blades of the pitting punches are disposed radially with respect to the common axis of each punch in order to allow them merely to cut into the fruits without removing the flesh thereof, and wherein said cutting blades on the punches are concave at the pitting ends so that said punches are active to positively engage against the pits within the fruits and to cause said pits to be centered in the ends of said pitting punches and prevented from slipping off the same sideways.

15. Apparatus for pitting cherries and the like, including pitting punches arranged in at least one pair which are axially substantially opposite, means for aligning the ends of a fruit with the pair of axially opposed pitting punches in order to bring the axis of the pit in said fruit in line with said punches, means for holding the fruit during the pitting operation, means for operating said punches and causing latter to cut into the opposite ends of the fruit and together grip the pit therein by the ends thereof and remove said pit through one end of said fruit when the ends of the latter are aligned with said punches and while the pit is gripped by said punches.

16. Apparatus for de-stemming fruits and berries from which the stems are intended to be removed and thereafter pitting the fruits, including pitting punches arranged in an axially substantially opposite pair, means for seizing the stem of a fruit and aligning the ends of the fruit with the pair of axially substantially opposite punches by drawing said stem and thereby shifting said fruit and then removing the stem from said fruit, and means for bringing said punches together upon the ends of the pit within the fruit and causing said punches to cut into the opposite ends of said fruit and together grip the pit between them and remove said pit through one end of said fruit while the pit is gripped between said punches.

17. Apparatus according to claim 15, in which at least one of the opposed pitting punches on one side comprises a resiliently self adjusting punch capable of automatic adjustment to accommodate various sizes of pits between the same and the respectively opposed punch on the other side.

GIOVANNI FROVA.